UNITED STATES PATENT OFFICE.

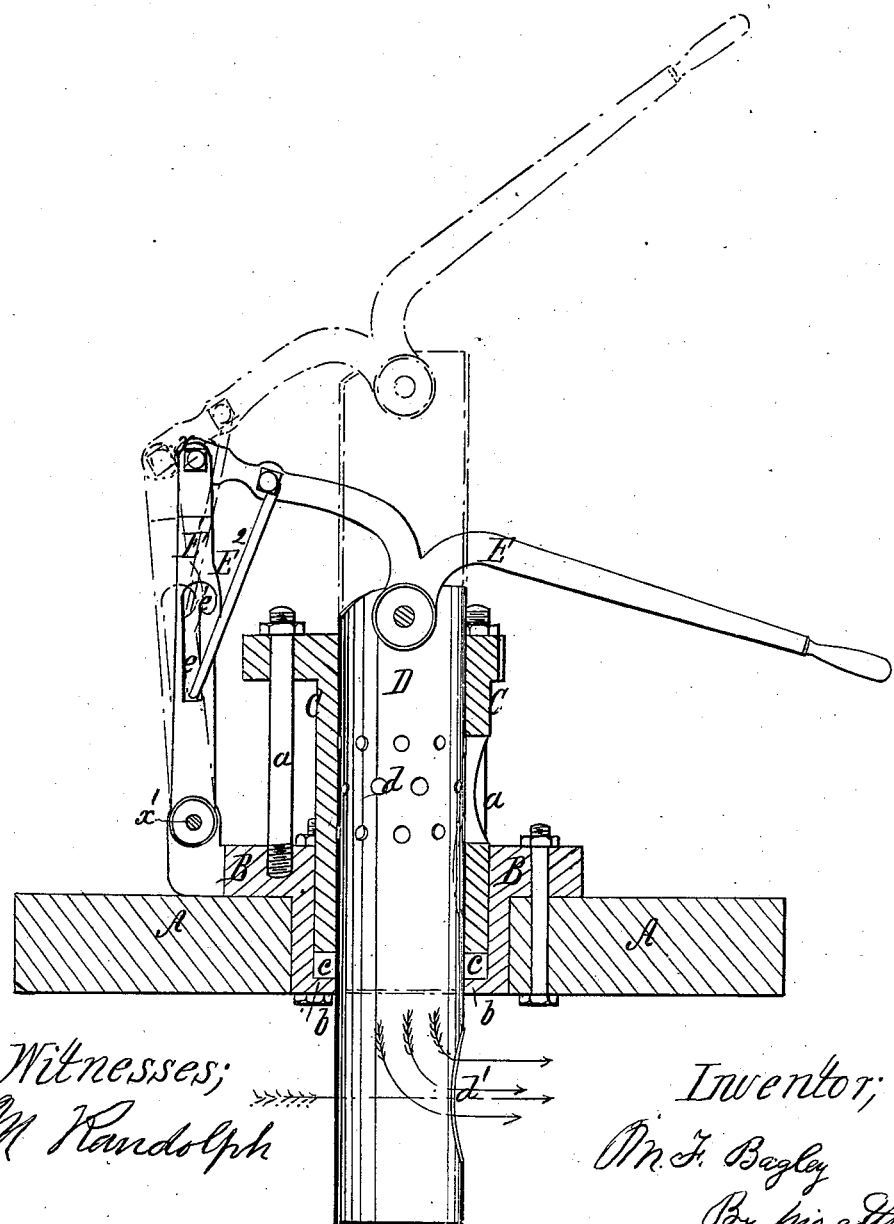

MOSES F. BAGLEY, OF ALTON, ILLINOIS.

IMPROVED DEVICE FOR DISCHARGING BILGE-WATER FROM THE HOLDS OF VESSELS.

Specification forming part of Letters Patent No. 59,161, dated October 30, 1866.

*To all whom it may concern:*

Be it known that I, MOSES F. BAGLEY, of Alton, in the county of Madison and State of Illinois, have invented certain new and useful Improvements in Apparatus for Discharging Bilge-Water from Sailing-Vessels; and I do hereby declare that the following is a full and clear description thereof, reference being had to the accompanying drawing, and to the letters of reference marked thereon.

The accompanying drawing represents a sectional elevation of the improved apparatus.

The nature of this invention consists in the insertion of a hollow plunger through the bottom planking of a ship or other vessel, the said plunger being perforated at its upper end with suitable orifices for the admission of the bilge-water from the hold of the vessel, and its lower end having a discharge-orifice in the side of the plunger toward the stern of the vessel, through which last-named orifice the bilge-water will escape with the current of the water in which the vessel is floating. This current or motion of the water beneath the vessel may be real or only relative—that is, the vessel may be moored to the bank of a river the current of which is moving in the direction to which the open end of the orifice in the lower end of the plunger points; or the vessel may be moving in comparatively still water, which will cause the same relative motion between the plunger and the water below it. In either case the friction of the water moving over the submerged end of the plunger will form a vacuum, more or less perfect, within the plunger, and the bilge-water within the vessel will flow into the said hollow plunger to fill the vacuum thus created, and a current will thus be created into and through the hollow plunger so long as any water remains in the hold of the vessel in parts accessible to the exit thus provided.

The form of the hollow plunger may be greatly varied in the details of construction; but in all cases it should be fitted to the planking of the vessel by means of suitable stuffing-box or packing arrangements.

To enable those skilled in the art to make and use my improved bilge-water discharger, I will proceed to describe its construction and operation.

A represents the bottom of the vessel; and B is a bed-plate or valve-socket of metal firmly fastened to it, care being taken to make perfectly water-tight the joint between these two parts by means of suitable packing. C is a gland, which is secured down to the bed-plate by means of suitable screw-bolts $a$. A packing, $c$, of rubber, hemp, or any other appropriate material, is placed on top of the flange $b$, forming the bottom part of the bed-plate, and is there forced tightly up around the cylindrical plunger D by screwing down the gland C upon it. When this is properly done there can be no water leak up into the vessel through the annular joint between $c$ and D.

The plunger D is a hollow cylinder, the upper end of which is perforated with suitable orifices $d$ for the admission of the bilge-water from the vessel, and its lower end has a discharging-orifice, $d'$, in one side of the plunger. The sides of the gland are perforated with orifices of sufficient area to supply the openings $d$ in the plunger.

The top end of the plunger is provided with a lever, E, by means of which it may be raised up or lowered down. When this discharging apparatus is not in use the plunger is to be drawn up by means of its lever, so that the orifice $d'$ will come above the packing $c$, in which position the plunger will form a perfectly water-tight plug for the opening in the bed-plate, through which it passes, as the extreme lower end of the plunger is made solid, and water can only enter it through the orifice $d'$. The back end of the lever is hinged at $x$ to the fulcrum E', which itself is hinged to the bed-plate at $x'$, so that its upper end is allowed a vibratory motion, thereby obviating the necessity for a connecting-rod between the lever and plunger.

Of course these are only details of construction, which may readily be changed by any experienced engineer.

A slot, $e$, cut in the fulcrum $E^1$, has a shoulder at $e'$, which forms a rest for the link $E^2$ when the lever and plunger are raised up, as shown in the red lines of the drawing, and when not needed for use the plunger may be held up by this arrangement.

The operation of this apparatus is as follows: A current of water flowing past the submerged end of the plunger in the direction of the red arrow will cause a partial vacuum to be formed in the plunger, to fill which the bilge-water in the vessel will flow through the apertures $d$, and down through the plunger, and out of the orifice $d'$, following the direction of the blue arrows. After a current of water has once been started through the plunger, the friction of the surrounding moving water upon the current as it leaves the orifice $d'$ will be sufficient to cause the flow to continue so long as there is any water in the hold of the vessel that can reach the openings $d$ and the current of the water below the vessel is kept up. The effect will be the same whether the plunger be moving forward in still water, or whether the plunger be stationary and the water moving past it.

From experiments already made I am satisfied that by the above means a stream of water several inches in diameter may be expelled from the bottom of a ship.

Having described my invention, what I claim is—

1. The hollow plunger D, the bed-plate B, and the gland C, when constructed and arranged substantially as herein described and set forth.

2. The plunger D, the lever E, and the fulcrum $E^1$, when constructed and arranged as described and set forth.

M. F. BAGLEY.

Witnesses:
M. RANDOLPH,
S. M. RANDOLPH.